United States Patent [19]

Bjerk

[11] 4,013,298
[45] Mar. 22, 1977

[54] DYNAMIC AIR BEARING SEAL FOR ENGINE CRANKSHAFT

[75] Inventor: Roger O. Bjerk, Edelstein, Ill.

[73] Assignee: Caterpillar Tractor Co., Peoria, Ill.

[22] Filed: Feb. 23, 1976

[21] Appl. No.: 660,535

[52] U.S. Cl. .............................................. 277/75
[51] Int. Cl.² ........................ F16J 9/00; F16J 15/46
[58] Field of Search .............................. 277/70–76

[56] References Cited
UNITED STATES PATENTS

| 3,815,926 | 6/1974 | Vore | 277/75 |
| 3,887,199 | 6/1975 | Sundquist | 277/74 |

Primary Examiner—Robert I. Smith
Attorney, Agent, or Firm—Phillips, Moore, Weissenberger, Lempio & Majestic

[57] ABSTRACT

An air bearing is coaxially mounted around a rotatable shaft, such as an engine crankshaft, by means of a flexible ring of open cell foam. Air flows through the foam cell ring to the bearing face. In this manner, continuous streams of air will flow past the seal to prevent oil or contaminants from moving in a direction opposite to the air flow direction.

10 Claims, 2 Drawing Figures

DYNAMIC AIR BEARING SEAL FOR ENGINE CRANKSHAFT

BACKGROUND OF THE INVENTION

This invention relates to dynamic seal assemblies of the type including air flow past the seal to prevent oil or contaminants from moving in a direction opposite to such air flow. In particular, this invention relates to an improved dynamic seal which includes a flexible mounting boot enabling movement of the seal in a radially outward direction.

Internal combustion engines require efficient seals at the ends of the crankshaft. These sealing means in the form of circumscribing seals perform several functions. First, they retain oil or other lubricant in the engine's crankcase. Second, they prevent contaminants from entering the engine from the surrounding environment. Such contaminants can, of course, result in shortened engine life.

One type of seal that has been found to be effective in this environment is that shown in U.S. Pat. No. 3,575,426 assigned to the assignee hereof. With this patent device a pair of lip seal assemblies are coaxially mounted around a rotational shaft to form a chamber therebetween adapted to be pressurized by air which lifts the seal out of contact with the shaft. In this manner continuous streams of air will flow past the seals to prevent oil or contaminants from moving in a direction opposite to such air flow. In addition, seal life is enhanced because the seals do not normally run against the surface of the shaft. When the shaft is at rest inherent resiliency of the seals or retainer springs located radially outwardly of the lips normally effects a positive contact with the shaft to contain oil or exclude contaminants. However, the subject seal tends to be rather stiff and lacks the flexibility desired. This results in some control problems being engendered in the selection of the amount of air flow necessary to lift the lip from the shaft surface.

SUMMARY AND OBJECTS OF THE INVENTION

The primary object of this invention is to overcome the above described and other problems. The solution takes the form of a pressurized sealing arrangement comprising a dynamic seal assembly mounted about a shaft and having a flexible mounting boot of open cell foam. The flexible mounting boot permits the seal to be moved in a radially outwardd direction away from the shaft surface. In this manner the seal is permitted to follow shaft movement and thereby achieve continuous sealing with the shaft.

Other objects and advantages of this invention will become more readily apparent from the following description and accompanying drawings.

DETAILED DESCRIPTION

Figure 1:
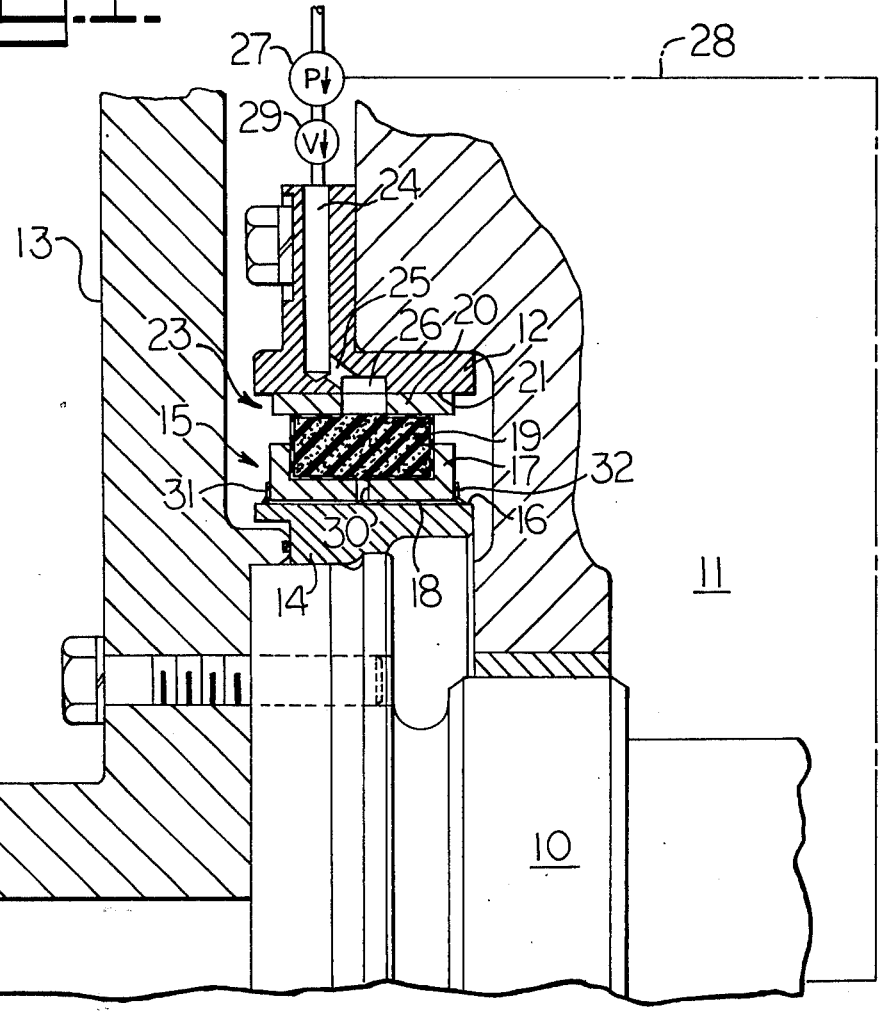
FIG. 1 is a cross-sectional view of the pressurized sealing arrangement of this invention in an engine.
Figure 2:
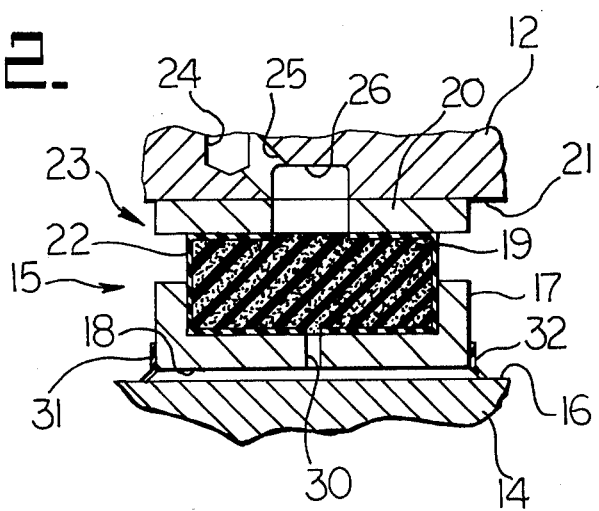
FIG. 2 is an enlarged cross-sectional view of the seal assembly of FIG. 1.

FIGS. 1 and 2 of the drawing show a cross-sectional view of the pressurized sealing arrangement of this invention employed in combination with a rotary crankshaft of an internal combustion engine. Although the sealing arrangement of this invention is hereinafter described in such a combination, it should be understood that the sealing arrangement could be used in other suitable applications involving rotary shafts.

Turning now to FIG. 1, there is shown a crankshaft 10 suitably mounted for rotation in an internal combustion engine in a conventional manner. A closed crankcase oil or lubricant retaining chamber, partially shown at 11, is arranged to lubricate the crankshaft support bearings and attendant structures. A seal adapter 12 aids in defining the subject crankcase. A flywheel 13 may be press-fitted or otherwise suitably secured onto one end of the crankshaft along with a cylindrical collar 14.

A seal assembly, shown generally at 15, is coaxially mounted between the crankshaft and the housing to seal chamber 11 and to prevent ambient contaminants such as dirt or other material from passing into the engine's interior space. As best seen in FIG. 2, a generally ring-shaped bearing 17 circumscibes shaft 10 and has an interior bearing surface 18 proximate to and in spaced relation with said shaft which has a low friction coating, such as Teflon coating, applied thereto. The low friction coating aids in preventing scuffing during startup or momentary touching of the surface to the shaft. Air bearing 17 is flexibly supported by a ring-shaped mounting member 19 of open cell foam construction. The mounting member is, in turn, supported by an outer bearing ring 20 which is fitted within bore 21 in seal adapter 12.

A thin, flexible, non-porous skin 22, of material such as rubber, is bonded to bearing 17 and outer ring 20 so as to enclose mounting member 19. In this manner the porous foam cell mounting ring and skin form a flexible mounting boot 23 enabling movement of the seal in a radially outward direction. The chamber thus defined is arranged to communicate with a passage 24 formed in the housing by way of a passage 25 and an annular groove 26. Means 27, such as a positive displacement air pump operably connected to be driven by the engine, may be arranged to pressurize the chamber formed in boot 23 for purposes hereinafter more fully described.

In operation, and with motive means 28 such as an engine operating to rotate crankshaft 10, pump 27 will be actuated automatically to communicate a pressurized fluid such as air into chamber 23 by way of passages 24 and 25 and annulus 26. Alternatively, a plurality of ports, notches, etc., could be used in lieu of the annulus. It should be understood that the pressure used will vary depending upon a number of design parameters such as bearing clearances and/or loads.

The air pressure may be constantly regulated by a valve 29 to maintain a predetermined and substantially constant pressure level in chamber 17. Such pressure will function to slightly raise bearing 17 out of contact with the surface 16 by means of air escaping through a plurality of orifices, one of which is shown at 30. Annular lip seals 31, 32 are mounted by e.g. bonding to the opposite sides of bearing 17. These lip seals assist in containing air between the bearing and the running surface as well as prevent back flow of contaminants. Outward flow of air from orifices 30 lifts seals 31, 32 when the engine is running. Since they are made of resilient material such as rubber, the lip seals return to a normal sealing relationship against surface 16 when the engine is not running.

It is to be understood that the foregoing description is merely illustrative of a preferred embodiment of the invention, and that the scope of the invention is not to be limited thereto, but is to be determined by the scope of the appended claims.

I claims:
1. A pressurized sealing arrangement comprising a rotatable shaft, a generally ring-shaped inner bearing of rigid material about said shaft defining an interior bearing surface thereon proxmiate to and in spaced relation with said shaft, said housing having at least one opening therein on said interior bearing surface, said bearing further including a flexible boot mounting means in the form of a porous ring of material and a thin non-porous skin thereover fixed to said bearing for supporting said inner bearing in spaced relation to said shaft, said skin further serving to define a chamber coterminous with said ring, and means for supplying pressurized air to said thus defined chamber so that air flows from said chamber through said at least one opening to continuously prevent retrograde movement of contaminants.

2. The invention of claim 1 further including a generally ring-shaped outer bearing, and wherein said flexible boot mounting means is included between said inner bearing and is mounted on said outer bearing.

3. The invention of claim 1 wherein said porous ring is of foam cell construction.

4. The invention of claim 1 wherein said skin is of rubber material.

5. The invention of claim 1 wherein said seal includes a low friction coating on the interior bearing surface thereof.

6. The invention of claim 5 wherein said low friction coating is of Teflon material.

7. The invention of claim 1 wherein said thin nonporous skin is bonded to said inner bearing, and said outer bearing.

8. The invention of claim 1 further including a pair of annular lip seals of resilient material mounted on said inner bearing in normal contacting relation with said rotatable shaft.

9. The invention of claim 8 wherein said resilient material is rubber.

10. The invention of claim 8 wherein said lip seals comprise a pair of seals mounted on opposite sides of said inner bearing so that air flowing from said means for supplying pressurized air flows into said chamber and out through said at least one opening and onto said shaft where it flows therealong and lifts said seals out of contacting relation therewith.

* * * * *